United States Patent
Huang et al.

(10) Patent No.: US 10,177,420 B2
(45) Date of Patent: Jan. 8, 2019

(54) CHARGER CIRCUIT AND POWER CONVERSION CIRCUIT THEREOF

(71) Applicant: RICHTEK TECHNOLOGY CORPORATION, Zhubei, HsinChu (TW)

(72) Inventors: Tsung-Wei Huang, Taipei (TW); Yu-Huei Lee, New Taipei (TW); Chun-Jen Shih, Taoyuan (TW); Ruei-Hong Peng, Miaoli (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 52 days.

(21) Appl. No.: 15/628,109

(22) Filed: Jun. 20, 2017

(65) Prior Publication Data
US 2018/0115025 A1    Apr. 26, 2018

Related U.S. Application Data (60) Provisional application No. 62/411,171, filed on Oct. 21, 2016.

(30) Foreign Application Priority Data

Apr. 19, 2017  (CN) .......................... 2017 1 0256513

(51) Int. Cl.
*H02J 7/04* (2006.01)
*H02J 7/16* (2006.01)
*H01M 10/44* (2006.01)
*H02J 7/00* (2006.01)
(Continued)

(52) U.S. Cl.
CPC ............ *H01M 10/443* (2013.01); *G05F 1/40* (2013.01); *H02J 7/008* (2013.01); *H02J 7/0052* (2013.01);
(Continued)

(58) Field of Classification Search
CPC ......... H02J 7/0091; H02J 7/008; Y02E 60/12; H01M 10/44; H01M 10/443
(Continued)

(56) References Cited

U.S. PATENT DOCUMENTS

4,302,714 A * 11/1981 Yefsky ............... G01R 31/3624
                                                              320/131
4,453,119 A *  6/1984 Staler ...................... H02J 7/008
                                                              136/293
(Continued)

*Primary Examiner* — Arun C Williams
(74) *Attorney, Agent, or Firm* — Tung & Associates (57) ABSTRACT

A charger circuit for providing a charging power to a battery includes a power delivery unit and a power conversion circuit. The power conversion circuit includes at least one conversion switch coupled to an inductor, a front stage switch conducting a DC power generated by the power delivery unit to generate a mid-stage power, and a direct charging switch. In a switching charging mode, the conversion switch converts the mid-stage power to the charging current onto a charging node. In a direct charging mode, the power delivery unit regulates the DC current, and the front stage switch and the direct charging switch conduct the DC current onto the charging node. The body diodes of the front stage switch and the direct charging switch are reversely coupled, and the body diodes of the front stage switch and the conversion switch are reversely coupled, for blocking the parasitic body current.

19 Claims, 4 Drawing Sheets

(51) Int. Cl.
*G05F 1/40* (2006.01)
*H02M 3/158* (2006.01)

(52) U.S. Cl.
CPC .......... *H02J 7/0065* (2013.01); *H02J 7/0091* (2013.01); *H02M 3/1588* (2013.01); *H01M 10/44* (2013.01); *H02J 2007/0059* (2013.01); *H02J 2007/0062* (2013.01); *H02M 2003/1586* (2013.01)

(58) Field of Classification Search
USPC ........................................................ 320/153
See application file for complete search history.

(56) References Cited

U.S. PATENT DOCUMENTS

| | | | | |
|---|---|---|---|---|
| 5,576,608 A | * | 11/1996 | Nagai | H02J 7/0019 320/159 |
| 5,990,665 A | * | 11/1999 | Kawata | H02J 7/0068 320/162 |
| 6,326,769 B1 | * | 12/2001 | Forsberg | H01M 10/44 320/124 |
| 2006/0145748 A1 | * | 7/2006 | Ki | H02M 3/073 327/536 |
| 2009/0309547 A1 | * | 12/2009 | Nakatsuji | H01M 10/441 320/134 |
| 2010/0022828 A1 | * | 1/2010 | Ono | A61B 1/00036 600/109 |
| 2011/0266998 A1 | * | 11/2011 | Xiao | H02J 7/0073 320/107 |
| 2012/0235641 A1 | * | 9/2012 | Yang | H02J 7/0024 320/110 |
| 2013/0300378 A1 | * | 11/2013 | Sugiyama | E02F 9/2091 320/162 |
| 2014/0312849 A1 | * | 10/2014 | Lee | H02J 7/0068 320/134 |

\* cited by examiner

CHARGER CIRCUIT AND POWER CONVERSION CIRCUIT THEREOF

CROSS REFERENCE

The present invention claims priority to U.S. 62/411,171, filed on Oct. 21, 2016; and CN 201710256513.2, filed on Apr. 19, 2017.

BACKGROUND OF THE INVENTION

Field of Invention

The present invention relates to a charger circuit; particularly, it relates to a charger circuit which can operate by a direct charging mode and a switching charging mode. The present invention also relates to a power conversion circuit for use in the charger circuit.

Description of Related Art

Figure 1:
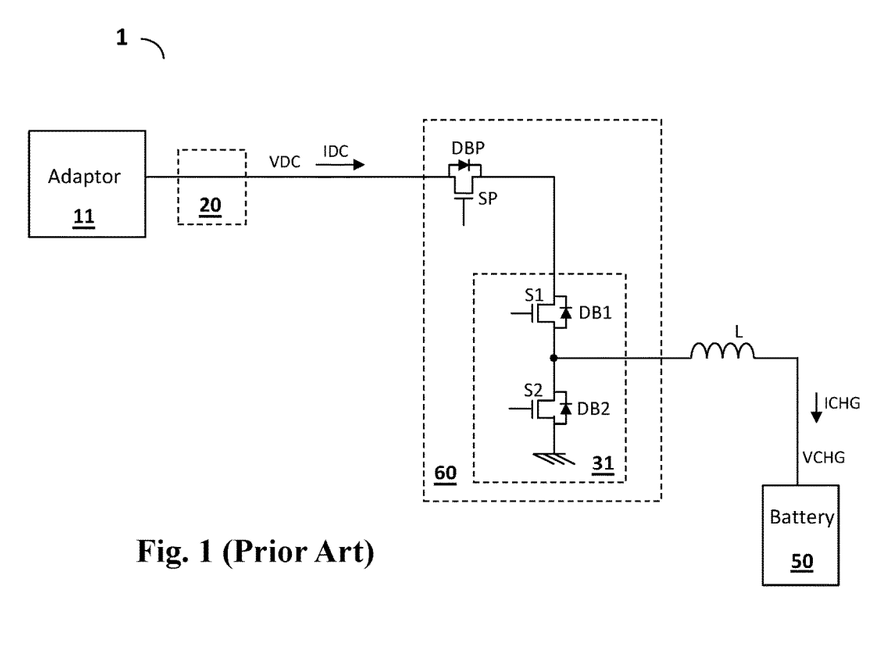
FIG. 1 shows a schematic diagram of a prior art charger circuit.

FIG. 1 shows a prior art charger circuit (charger circuit 1) which includes a switching conversion circuit 60 for converting the power (for example but not limited to 5V, 9V, or 12V VBUS compliant with USB PD specification) provided by an adaptor 11 to a charging current ICHG to charge the battery 50.

A drawback of the prior art circuit in FIG. 1 is that the power conversion efficiency is low due to 2-stage power conversion (by the adaptor 11 and the switching conversion circuit 60). Besides, in compact-size applications such as smart phone, etc., the temperature of the switching conversion circuit 60 could be too high if the charging operation is performed by a high constant charging current ICHG. Therefore, usually the charging current to charge the battery is limited (such as below 3 A), and thus the charging time cannot be effectively shortened.

Figure 2:
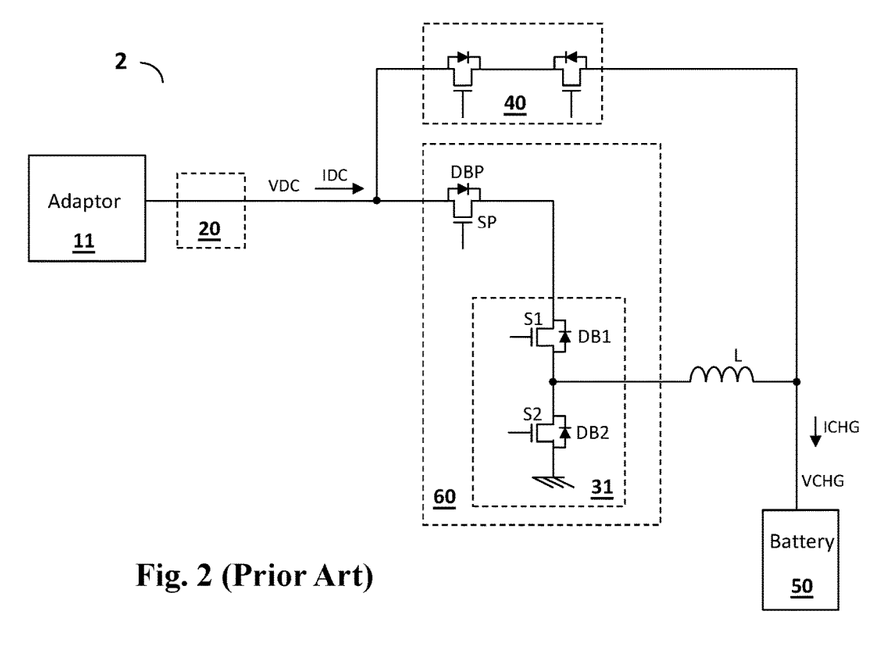
FIG. 2 shows schematic diagrams of another prior art charger circuit.

FIG. 2 shows a prior art charger circuit (charger circuit 2) which is similar to the charger circuit 1, but is different in that the charger circuit 2 further comprises a load switch 40 for direct charging operation. When operating in a charging phase which requires a larger charging current, the adaptor 12 provides a constant DC current IDC through a cable 20 (for example a USB cable) and the load switch 40 to charge the battery 50 directly, wherein the DC current IDC is substantially the same as the charging current ICHG. In the direct charging mode, the charger circuit 2 has a higher power conversion efficiency because only one power conversion stage (adaptor 12) is involved. Hence, in in compact-size applications such as smart phone, etc., the charger circuit 2 can charge the battery with a higher constant charging current (for example larger than 3 A), whereby the charging time can be effectively shortened while the operation temperature of the mobile device would not be too high. And in other charging phases such as in the pre-charging and constant voltage charging phases, the switching charger circuit 60 converts the power (for example but not limited to 5V, 9V, or 12V VBUS compliant with USB PD specification) provided by the adaptor 12 to charging power, to charge the battery 50.

In the prior art of FIG. 2, the switching charger circuit 40 and the load switch 40 are typically manufactured as separated integrated circuits in separated packages, and therefore the prior art of FIG. 2 has drawbacks that: first, the control scheme of the charger circuit 2 is complex, and second, it has a higher cost.

Compared to the prior art in FIG. 1, the present invention is advantageous in having both the direct charging path and the switching charging conversion path, whereby the present invention can charge the battery with a larger current to shorten the charging time while keeping the operation temperature of the mobile device in a low condition. Compared to the prior art in FIG. 2, the present invention is advantageous in integrating the aforementioned switching charger circuit and the load switch into one integrated circuit (or in one integrated package), so that the control scheme is less complex, and the overall size and cost are smaller.

SUMMARY OF THE INVENTION

From one perspective, the present invention provides a charger circuit, configured to operably convert an input power to a charging power for charging a battery which is coupled to a charging node, wherein the charging power includes a charging voltage and a charging current; the charger circuit comprising: a power delivery unit, configured to convert the input power to a DC power, wherein the DC power includes a DC voltage and a DC current; and a power conversion circuit which includes: a conversion switch circuit including at least one conversion switch, the conversion switch circuit being coupled to an inductor; a front stage switch coupled between the DC power and a mid-stage node, configured to operably convert the DC power to a mid-stage power, wherein the mid-stage power includes a mid-stage voltage and a mid-stage current; a direct charging switch, coupled between the mid-stage node and the charging node; and a control circuit, configured to operably generate a front stage switch control signal, a direct charging switch control signal, and a conversion switch control signal for controlling the front stage switch, the direct charging switch, and the conversion switch respectively; wherein in a switching charging mode, the control circuit controls the front stage switch to be ON and the direct charging switch to be OFF, and operates the conversion switch to convert the mid-stage power to the charging power onto the charging node; and in a direct charging mode, the control circuit controls both the front stage switch and the direct charging switch to be ON for conducting the DC power to the charging node as the charging power.

In one embodiment, each of the front stage switch, the direct charging switch, and the conversion switch has a body diode, wherein the body diode of the front stage switch is reversely coupled to the body diode of the conversion switch, and the body diode of the front stage switch is reversely coupled to the body diode of the direct charging switch, whereby a parasitic body current of the body diode of the conversion switch or of the body diode of the direct charging switch is blocked.

In one embodiment, in the direct charging mode, the power delivery unit regulates the DC current to a predetermined DC current level according to a DC current related signal, and/or regulates the DC voltage to a predetermined DC voltage level according to a DC voltage related signal.

In one embodiment, the front stage switch is further configured to operably sense the DC current to generate the DC current related signal.

In one embodiment, the charger circuit further comprises further comprises a cable and/or a connector coupled between the power delivery unit and the front stage switch, wherein the cable and/or the connector is compliant with USB or USB PD (Universal Serial Bus Power Delivery) specification and includes one or more power lines for transmitting the DC output power and one or more signal lines for transmitting one or more of the DC current related signal, the DC voltage related signal, a charging current related signal, and a charging voltage related signal.

In one embodiment, the front stage switch and/or the direct charging switch is further for use in one or more of the following functions: (1) over voltage protection of the DC voltage; (2) over current protection of the DC current, the mid-stage current and/or the charging current; and (3) plug-out protection of the DC power.

From another perspective, the present invention provides a power conversion circuit for use in a charger circuit which is configured to provide a charging power for charging a battery which is coupled to a charging node, wherein the charging power includes a charging voltage and a charging current, and wherein the power conversion circuit receives a DC power which includes a DC voltage and a DC current; the power conversion circuit comprising: a conversion switch circuit including at least one conversion switch, the conversion switch circuit being coupled to an inductor; a front stage switch coupled between the DC power and a mid-stage node, configured to operably convert the DC power to a mid-stage power, wherein the mid-stage power includes a mid-stage voltage and a mid-stage current; a direct charging switch, coupled between the mid-stage node and the charging node; and a control circuit, configured to operably generate a front stage switch control signal, a direct charging switch control signal, and a conversion switch control signal for controlling the front stage switch, the direct charging switch, and the conversion switch respectively; wherein in a switching charging mode, the control circuit controls the front stage switch to be ON and the direct charging switch to be OFF, and operates the conversion switch to convert the mid-stage power to the charging power onto the charging node; and in a direct charging mode, the control circuit controls both the front stage switch and the direct charging switch to be ON for conducting the DC power to the charging node as the charging power.

From another perspective, the present invention provides a power conversion circuit for use in a charger circuit which is configured to provide a charging power for charging a battery which is coupled to a charging node, wherein the charging power includes a charging voltage and a charging current, and wherein the power conversion circuit receives a DC power which includes a DC voltage and a DC current; the charger circuit including a direct charging switch, coupled between a mid-stage node and a charging node; the power conversion circuit comprising: a conversion switch circuit including at least one conversion switch, the conversion switch circuit being coupled to an inductor; a front stage switch coupled between the DC power and the mid-stage node, configured to operably convert the DC power to a mid-stage power, wherein the mid-stage power includes a mid-stage voltage and a mid-stage current; and a control circuit, configured to operably generate a front stage switch control signal, a direct charging switch control signal, and a conversion switch control signal for controlling the front stage switch, the direct charging switch, and the conversion switch respectively; wherein in a switching charging mode, the control circuit controls the front stage switch to be ON and the direct charging switch to be OFF, and operates the conversion switch to convert the mid-stage power to the charging power onto the charging node; and in a direct charging mode, the control circuit controls both the front stage switch and the direct charging switch to be ON for conducting the DC power to the charging node as the charging power.

In one embodiment, the power conversion circuit is integrated in one integrated circuit or is packaged in one integrated package.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 3:
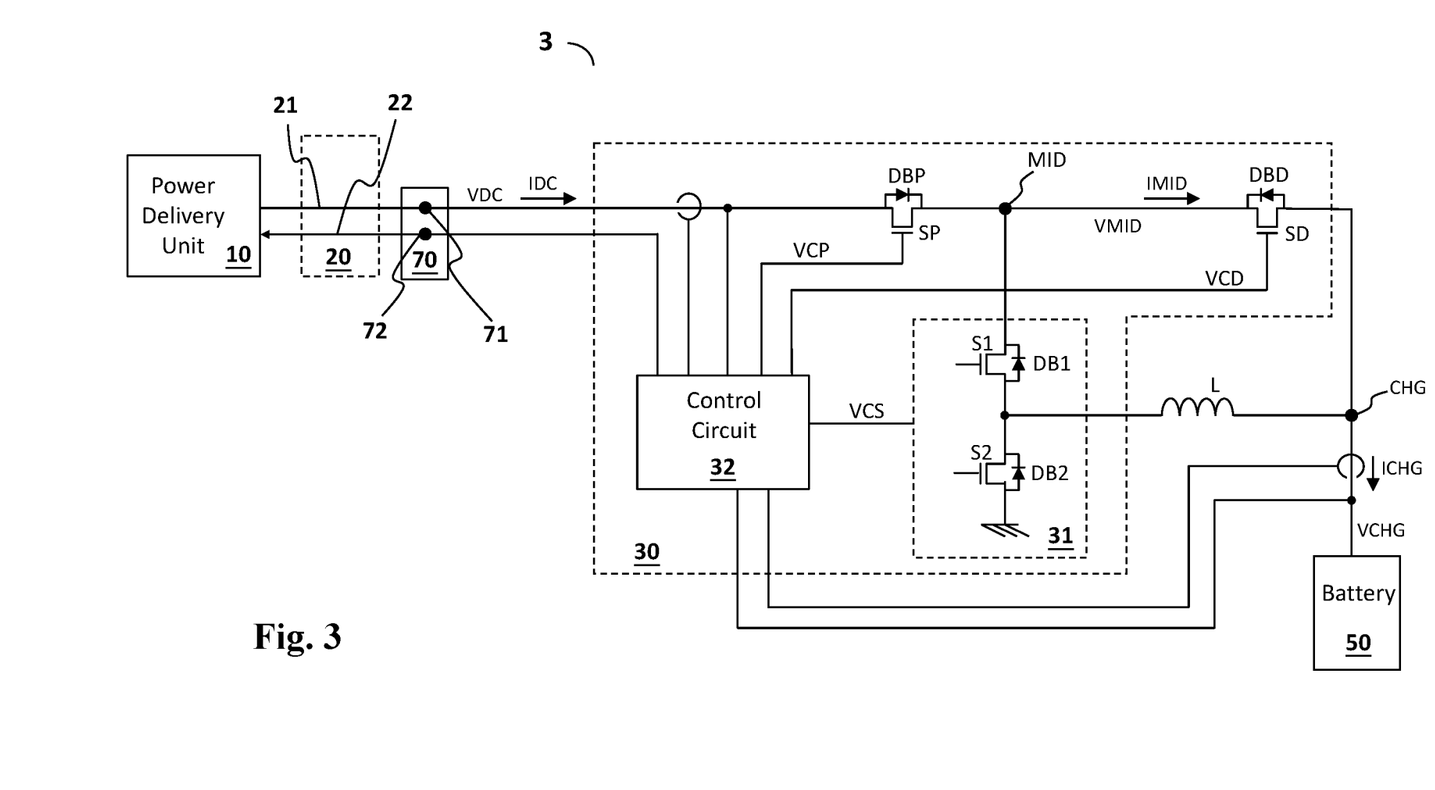
FIG. 3 shows a schematic diagram of an embodiment of the charger circuit according to the present invention.

FIG. 3 shows one embodiment of the charger circuit according to the present invention (charger circuit 3). As shown in the figure, the charger circuit 3 is configured to operably convert an input power to a charging power for charging a battery 50, wherein the charging power includes a charging voltage VCHG and a charging current ICHG. The charger circuit 3 comprises a power delivery unit 10 and a power conversion circuit 30.

The power delivery unit 10 converts the input power to a DC power, wherein the DC power includes a DC voltage VDC and a DC current IDC. The power delivery unit 10 may be for example a power adaptor which converts the input power in AC form to the aforementioned DC power, or may be a DC-DC conversion circuit which converts the input power providing from for example a power bank to the aforementioned DC power.

The power conversion circuit 30 includes a conversion switch circuit 31, a front stage switch SP, a direct charging switch SD, and a control circuit 32. The conversion switch circuit 31 is coupled with an inductor L; the conversion switch circuit 31 includes at least one conversion switch (for example but not limited to the conversion switches S1 and S2), wherein the conversion switch includes a body diode (for example but not limited to the body diodes DB1 and DB2 of the corresponding conversion switches S1 and S2). In another embodiment, the conversion switch circuit 31 may include one conversion switch and one diode. The front stage switch SP is coupled between the DC power and a mid-stage node MID; the front stage switch SP converts the DC power to a mid-stage power, wherein the mid-stage power includes a mid-stage voltage VMID and a mid-stage current IMID. The front stage switch SP includes a body diode (for example the body diode DBP as shown in the figure). The direct charging switch SD is coupled between the mid-stage node MID and a charging node CHG; the direct charging switch SD includes a body diode (for example the body diode DBD as shown in the figure). The aforementioned body diode indicates for example a parasitic body diode formed between a bulk and a source, or between a bulk and a drain, in a metal oxide semiconductor (MOS) transistor.

The control circuit 32 is configured to operably generate a front stage switch control signal VCP, a direct charging switch control signal VCD, and a conversion switch control signal VCS for controlling the front stage switch SP, the direct charging switch SD, and the conversion switches (S1 and S2) respectively.

In a switching charging mode, the control circuit 32 controls the front stage switch SP to be ON and the direct charging switch SD to be OFF, and operates the conversion switches S1 and S2 to convert the mid-stage power to the charging power onto the charging node CHG according to a charging voltage related signal and/or a charging current related signal, such that the charging voltage VCHG is regulated to a predetermined charging voltage level and/or the charging current ICHG is regulated to a predetermined charging current level.

Besides, in a direct charging mode, the power delivery unit 10 regulates the DC current IDC to a predetermined DC current level according to a DC current related signal, and/or regulates the DC voltage VDC to a predetermined DC voltage level according to a DC voltage related signal, and the control circuit 32 controls both the front stage switch SP and the direct charging switch SD to be ON for conducting the DC power to the charging node CHG as the charging power.

Note that the aforementioned conversion switch circuit 31 is not limited to the buck conversion switch circuit as shown in the figure, but may be other types of conversion switch circuits such as a boost or buck-boost conversion switch circuit.

Still referring to FIG. 3, in one embodiment according to the present invention, the power conversion circuit 30 may be integrated in one integrated circuit or packaged in one integrated package, such that one packaged device can achieve both the direct charging function and the switching power conversion charging function; thus, the control scheme is less complex (because no cross-chip or cross-package communication is required) and the size and cost can be reduced.

Figure 4:
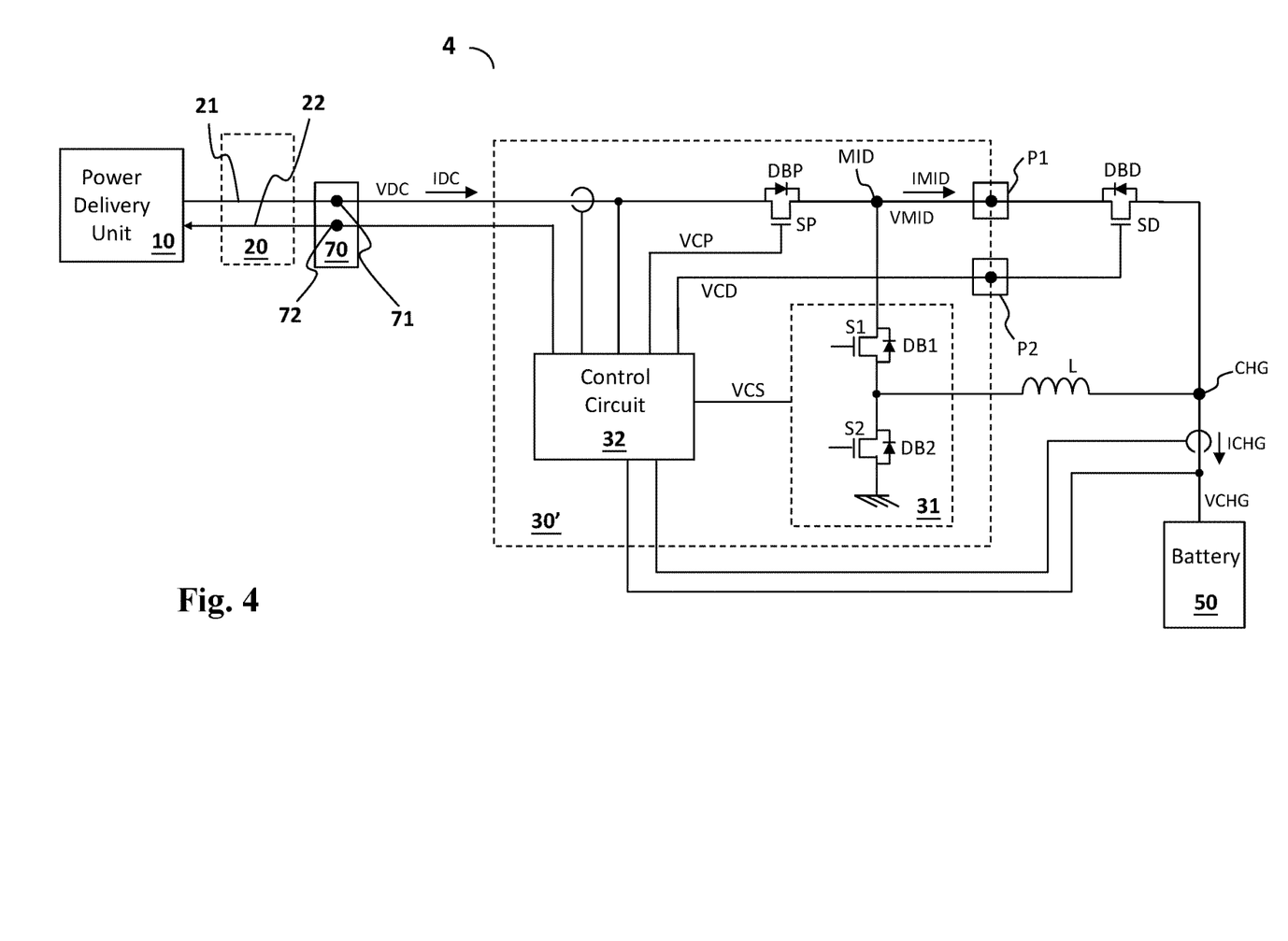
FIG. 4 shows a schematic diagram of another embodiment of the charger circuit according to the present invention.

However, in another embodiment, the direct charging switch SD may not be integrated in the integrated circuit or not packaged in the integrated package. Referring to FIG. 4 which shows one embodiment of the charger circuit (charger circuit 4) of the present invention. In this embodiment, the power conversion circuit 30' does not integrate the direct charging switch SD within it. In this case, the power conversion circuit 30' which is one integrated circuit may include a pin P1 to be coupled between a current inflow terminal of the direct charging switch SD and the mid-stage node MID, and a pin P2 to be coupled between a control terminal of the direct charging switch SD and the direct charging switch control signal VCD, whereby all the aforementioned charging modes can be achieved.

Note that: under the circumstances when for example the DC voltage VDC is relatively lower and the charging voltage VCHG is relatively higher (i.e. the battery voltage is relatively higher), a reverse current through the parasitic body diode (the parasitic body diode current) can occur even when all the aforementioned switches are OFF, wherein the term "reverse current" indicates that the current flows in an opposite direction against the charging current. Still referring FIGS. 3 and 4, in one embodiment, for avoiding the aforementioned parasitic body current, the body diode DBP of the front stage switch SP is reversely coupled to the body diode (DB1 or DB2) of the conversion switch (S1 or S2), and the body diode DBP of the front stage switch SP is reversely coupled to the body diode DBD of the direct charging switch SD, whereby the parasitic body current of the body diode (DB1, DB2, or DBD) of the conversion switch S1 or S2 or the direct charging switch SD is blocked. Note that for blocking the parasitic body current, it is not limited to reversely coupling the body diodes of the switches. In one embodiment, the conversion switch circuit may include a power device having a reverse-blocking function, such as a power diode, which may be reversely coupled to the body diode of the front stage switch SP for blocking the parasitic body current. In other words, if the charging current path in the switching charging mode includes at least a pair of reversely coupled body diodes, or at least one diode reversely coupled to a body diode, it is sufficient to block the parasitic body diode current and should be interpreted to fall within the scope of the present invention.

Still referring to FIGS. 3 and 4, in one embodiment, the front stage switch SP may be configured to sense the DC current IDC to generate the aforementioned DC current related signal for regulating the DC current (For example, the voltage difference between the front stage switch SP is a DC current related signal which can be used to determine the DC current IDC). And in one embodiment, the DC current related signal can also be used to control the conversion switches S1 and S2 for regulating the charging voltage or the charging current.

Still referring to FIGS. 3 and 4, in one embodiment, the charger circuit 3 or 4 may further comprise a cable 20 and/or a connector 70 coupled between the power delivery unit 10 and the front stage switch SP, wherein the cable 20 and/or the connector 70 is compliant with USB or USB PD (Universal Serial Bus Power Delivery) specification, and includes one or more power lines for transmitting the DC output power and one or more signal lines for transmitting one or more of the DC current related signal, the DC voltage related signal, the charging current related signal, and the charging voltage related signal. As examples, the figures show a power line 21 of the cable 20 and a power contact pin 71 of the connector 70, and a signal line 22 of the cable 20 and a signal contact pin 72 of the connector 70.

Figure 5:
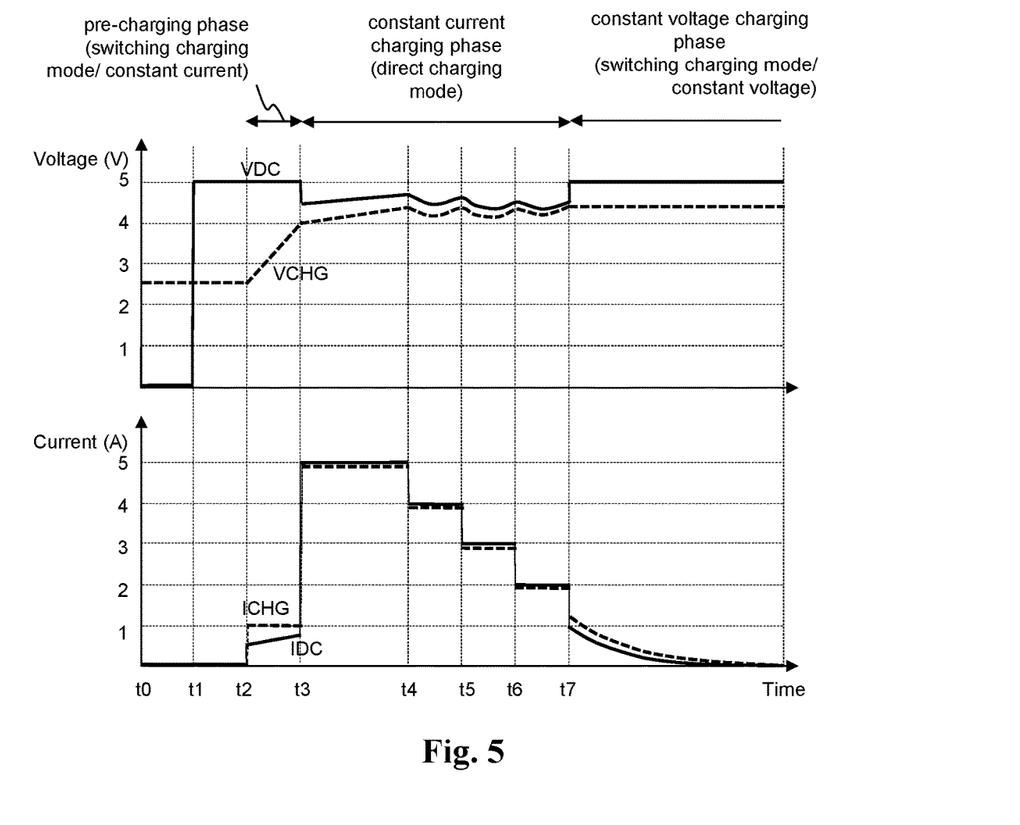
FIG. 5 shows simulation waveforms corresponding to the charger circuits of FIGS. 3 and 4.

FIG. 5 shows simulation waveforms corresponding to the charger circuit 3 or 4 as shown in FIG. 3 or 4, which shows a complete charging process of a battery (for example charging the aforementioned battery 50). Referring to FIGS. 3, 4 and 5, in the pre-charging phase between t2 and t3, the charger circuit 3 or 4 of the present invention performs the aforementioned switching charging (i.e. charging by switching power conversion) to charge the battery 50 with a relatively smaller constant current (for example trickle charging). As shown in FIG. 5, the DC voltage VDC (the solid line at the upper part of FIG. 5) is regulated to 5V, and the conversion switch circuit 31 in FIG. 3 or 4 converts the DC voltage VDC to the charging current ICHG (the dashed line at the lower part of FIG. 5) which is regulated at a constant current level around 1 A for pre-charging the battery 50, wherein the front stage switch SP is ON and the direct charging switch SD is OFF in this phase.

Still referring to FIG. 5, in the constant current charging phase from t3 to t7, the power delivery unit 10 regulates the DC current IDC (the solid line at the lower part of FIG. 5) to one or more constant current levels for direct charging the battery 50. As shown in the figure, in one preferred embodiment, the power delivery unit 10 can regulate the DC current IDC to multiple different constant current levels (for example 5 A, 4 A, 3 A, and 2 A as shown in the figure) in multiple different time slots (t3-t4-t5-t6-t7). In this phase, both the front stage switch SP and the direct charging switch SD are ON, and the conversion switch circuit 30 does not convert power; the charging current ICHG is substantially the same as the DC current IDC. This is the direct charging mode.

Still referring to FIG. 5, in the constant voltage charging phase after t7, the charger circuit 3 or 4 charges the battery 50 by a constant voltage. As shown in the figure, in this embodiment, the power delivery unit 10 regulates the DC voltage VDC to 5V, and the conversion switch circuit 31 in FIG. 3 or 4 converts the DC voltage VDC to the charging voltage VCHG (the dashed line at the upper part of FIG. 5) which is regulated at a constant voltage level around for example 4.2V for charging the battery 50. In this phase, the current ICHG naturally decays with time. There can be an end of charge phase similar to the pre-charging, to charge the battery 50 with a small current, which is not shown. The switching charging mode includes the pre-charging phase and the constant voltage charging phase.

Besides, in one embodiment, the front stage switch SP and/or the direct charging switch SD can be configured for one or more of the following protection operations: (1) over voltage protection of the DC voltage, wherein the front stage switch SP and/or the direct charging switch SD is controlled to be OFF when the DC voltage VDC is higher than an over voltage threshold (which can be judged according to a DC voltage related signal such as the DC voltage itself or a divided voltage of the DC voltage), to protect the battery 50 or the circuits receiving the DC voltage; (2) over current protection of the DC current, the mid-stage current, and/or the charging current, wherein the front stage switch SP and/or the direct charging switch SD is controlled to be OFF or to operate in a linear region when the DC current, the mid-stage current, and/or the charging current is higher than its corresponding over current threshold (which can be judged according to one or more of a DC current related signal, a mid-stage current related signal, and a charging current related signal, wherein these signals for example can be a current sense signal obtained in a path of the DC current, the mid-stage current, or the charging current), to protect the battery 50 or the circuits receiving one of these currents; and (3) plug-out protection of the DC power, wherein the front stage switch SP and/or the direct charging switch SD is controlled to be OFF when it is detected that the power delivery unit 10 is plug-out condition or is not transmitting power (which can be judged for example according the DC voltage related signal and/or the DC current related signal), to protect the battery 50 or the circuits receiving the DC power.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. As an example, the charger circuit of the present invention may further include a system switch between the conversion switch circuit and the battery for separating a system voltage (supplied to circuits other than the battery) and the charging voltage. As a further example, the system switch can be a linear regulation switch. As another example, the arrangement of the current flow directions of the body diodes of the aforementioned embodiments are for illustrative purpose but not for limiting the scope of the present invention. The body diode of a transistor may be reversely coupled as long as the required functions can be met. As another example, the aforementioned power conversion circuit may alternatively be a linear power conversion circuit; in one preferred embodiment, the linear power conversion circuit and the direct charging path share a common switch in their current paths. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A charger circuit, configured to operably convert an input power to a charging power for charging a battery which is coupled to a charging node, wherein the charging power includes a charging voltage and a charging current; the charger circuit comprising:
   a power delivery unit, configured to convert the input power to a DC power, wherein the DC power includes a DC voltage and a DC current; and
   a power conversion circuit which includes:
      a conversion switch circuit including at least one conversion switch, the conversion switch circuit being coupled to an inductor;
      a front stage switch coupled between the DC power and a mid-stage node, configured to operably convert the DC power to a mid-stage power, wherein the mid-stage power includes a mid-stage voltage and a mid-stage current;
      a direct charging switch, coupled between the mid-stage node and the charging node; and
      a control circuit, configured to operably generate a front stage switch control signal, a direct charging switch control signal, and a conversion switch control signal for controlling the front stage switch, the direct charging switch, and the conversion switch respectively;
   wherein in a switching charging mode, the control circuit controls the front stage switch to be ON and the direct charging switch to be OFF, and operates the conversion switch to convert the mid-stage power to the charging power onto the charging node; and
   in a direct charging mode, the control circuit controls both the front stage switch and the direct charging switch to be ON for conducting the DC power to the charging node as the charging power.

2. The charger circuit of claim 1, wherein each of the front stage switch, the direct charging switch, and the conversion switch has a body diode, wherein the body diode of the front stage switch is reversely coupled to the body diode of the conversion switch, and the body diode of the front stage switch is reversely coupled to the body diode of the direct charging switch, whereby a parasitic body current of the body diode of the conversion switch or of the body diode of the direct charging switch is blocked.

3. The charger circuit of claim 1, wherein in the direct charging mode, the power delivery unit regulates the DC current to a predetermined DC current level according to a DC current related signal, and/or regulates the DC voltage to a predetermined DC voltage level according to a DC voltage related signal.

4. The charger circuit of claim 3, wherein the front stage switch is further configured to operably sense the DC current to generate the DC current related signal.

5. The charger circuit of claim 1, further comprising a cable and/or a connector coupled between the power delivery unit and the front stage switch, wherein the cable and/or the connector is compliant with USB or USB PD (Universal Serial Bus Power Delivery) specification and includes one or more power lines for transmitting the DC output power and one or more signal lines for transmitting one or more of the DC current related signal, the DC voltage related signal, a charging current related signal, and a charging voltage related signal.

6. The charger circuit of claim 1, wherein the front stage switch and/or the direct charging switch is further for use in one or more of the following functions: (1) over voltage protection of the DC voltage; (2) over current protection of the DC current, the mid-stage current and/or the charging current; and (3) plug-out protection of the DC power.

7. The charger circuit of claim 1, wherein the power conversion circuit is integrated in one integrated circuit or is packaged in one integrated package.

8. A power conversion circuit for use in a charger circuit which is configured to provide a charging power for charging a battery which is coupled to a charging node, wherein the charging power includes a charging voltage and a charging current, and wherein the power conversion circuit receives a DC power which includes a DC voltage and a DC current; the power conversion circuit comprising:
 a conversion switch circuit including at least one conversion switch, the conversion switch circuit being coupled to an inductor;
 a front stage switch coupled between the DC power and a mid-stage node, configured to operably convert the DC power to a mid-stage power, wherein the mid-stage power includes a mid-stage voltage and a mid-stage current;
 a direct charging switch, coupled between the mid-stage node and the charging node; and
 a control circuit, configured to operably generate a front stage switch control signal, a direct charging switch control signal, and a conversion switch control signal for controlling the front stage switch, the direct charging switch, and the conversion switch respectively;
 wherein in a switching charging mode, the control circuit controls the front stage switch to be ON and the direct charging switch to be OFF, and operates the conversion switch to convert the mid-stage power to the charging power onto the charging node; and
 in a direct charging mode, the control circuit controls both the front stage switch and the direct charging switch to be ON for conducting the DC power to the charging node as the charging power.

9. The power conversion circuit of claim 8, wherein each of the front stage switch, the direct charging switch, and the conversion switch has a body diode, and the body diode of the front stage switch is reversely coupled to the body diode of the conversion switch, and the body diode of the front stage switch is reversely coupled to the body diode of the direct charging switch, whereby a parasitic body current of the body diode of the conversion switch or of the body diode of the direct charging switch is blocked.

10. The power conversion circuit of claim 8, wherein in the direct charging mode, the DC current is regulated to a predetermined DC current level according to a DC current related signal, and/or the DC voltage is regulated to a predetermined DC voltage level according to a DC voltage related signal.

11. The power conversion circuit of claim 10, wherein the front stage switch is further configured to operably sense the DC current to generate the DC current related signal.

12. The power conversion circuit of claim 8, wherein the front stage switch and/or the direct charging switch is further for use in one or more of the following functions: (1) over voltage protection of the DC voltage; (2) over current protection of the DC current, the mid-stage current and/or the charging current; and (3) plug-out protection of the DC power.

13. The power conversion circuit of claim 8, which is integrated in one integrated circuit or is packaged in one integrated package.

14. A power conversion circuit for use in a charger circuit which is configured to provide a charging power for charging a battery which is coupled to a charging node, wherein the charging power includes a charging voltage and a charging current, and wherein the power conversion circuit receives a DC power which includes a DC voltage and a DC current; the charger circuit including a direct charging switch, coupled between a mid-stage node and a charging node; the power conversion circuit comprising:
 a conversion switch circuit including at least one conversion switch, the conversion switch circuit being coupled to an inductor;
 a front stage switch coupled between the DC power and the mid-stage node, configured to operably convert the DC power to a mid-stage power, wherein the mid-stage power includes a mid-stage voltage and a mid-stage current; and
 a control circuit, configured to operably generate a front stage switch control signal, a direct charging switch control signal, and a conversion switch control signal for controlling the front stage switch, the direct charging switch, and the conversion switch respectively;
 wherein in a switching charging mode, the control circuit controls the front stage switch to be ON and the direct charging switch to be OFF, and operates the conversion switch to convert the mid-stage power to the charging power onto the charging node; and
 in a direct charging mode, the control circuit controls both the front stage switch and the direct charging switch to be ON for conducting the DC power to the charging node as the charging power.

15. The power conversion circuit of claim 14, wherein each of the front stage switch, the direct charging switch, and the conversion switch has a body diode, and the body diode of the front stage switch is reversely coupled to the body diode of the conversion switch, and the body diode of the front stage switch is reversely coupled to the body diode of the direct charging switch, whereby a parasitic body current of the body diode of the conversion switch or of the body diode of the direct charging switch is blocked.

16. The power conversion circuit of claim 14, wherein in the direct charging mode, the DC current is regulated to a predetermined DC current level according to a DC current related signal, and/or the DC voltage is regulated to a predetermined DC voltage level according to a DC voltage related signal.

17. The power conversion circuit of claim 16, wherein the front stage switch is further configured to operably sense the DC current to generate the DC current related signal.

18. The power conversion circuit of claim 14, wherein the front stage switch and/or the direct charging switch is further for use in one or more of the following functions: (1) over voltage protection of the DC voltage; (2) over current protection of the DC current, the mid-stage current and/or the charging current; and (3) plug-out protection of the DC power.

19. The power conversion circuit of claim 14, which is integrated in one integrated circuit or is packaged in one integrated package.

* * * * *